(12) United States Patent
Lee et al.

(10) Patent No.: US 8,544,787 B2
(45) Date of Patent: Oct. 1, 2013

(54) HIGH PERFORMANCE TILT ROTOR AIRCRAFT IN WHICH NACELLE TILT ANGLE AND FLAPERON ANGLE MECHANICALLY INTERWORK WITH EACH OTHER

(75) Inventors: Myeong Kyu Lee, Daejeon (KR); Sung Ho Chang, Daejeon (KR); Seong Wook Choi, Daejeon (KR); Sam Ok Koo, Daejeon (KR); Jai Moo Kim, Daejeon (KR)

(73) Assignee: Korea Aerospace Research Institute (KR)

( * ) Notice: Subject to any disclaimer, the term of this patent is extended or adjusted under 35 U.S.C. 154(b) by 19 days.

(21) Appl. No.: 13/476,274

(22) Filed: May 21, 2012

(65) Prior Publication Data

US 2013/0026302 A1 Jan. 31, 2013

(30) Foreign Application Priority Data

Jul. 29, 2011 (KR) ........................ 10-2011-0075646

(51) Int. Cl.
*B64C 27/22* (2006.01)
*B64C 29/00* (2006.01)

(52) U.S. Cl.
USPC .............. 244/7 R; 244/7 A; 244/12.4; 244/56

(58) Field of Classification Search
USPC ................ 244/7 R, 7 A, 12.4, 23 B, 56, 99.2, 244/99.3; 701/3–6
See application file for complete search history.

(56) References Cited

U.S. PATENT DOCUMENTS

| | | | | | |
|---|---|---|---|---|---|
| 2,708,081 | A * | 5/1955 | Dobson | ......................... | 244/7 C |
| 3,039,719 | A * | 6/1962 | Platt | .............................. | 244/7 C |
| 3,107,882 | A * | 10/1963 | Matteson et al. | ............. | 244/7 C |
| 3,181,810 | A * | 5/1965 | Olson | ........................... | 244/7 R |
| 3,586,262 | A * | 6/1971 | Sherman | ....................... | 244/7 R |
| 5,096,140 | A * | 3/1992 | Dornier et al. | ................ | 244/7 C |
| 5,141,176 | A * | 8/1992 | Kress et al. | ................... | 244/7 C |
| 5,405,105 | A * | 4/1995 | Kress | ............................. | 244/7 C |
| 6,607,161 | B1 * | 8/2003 | Krysinski et al. | ............. | 244/7 A |
| 6,896,221 | B1 * | 5/2005 | Einarsson | ..................... | 244/7 C |
| 7,871,033 | B2 * | 1/2011 | Karem et al. | ................. | 244/7 A |
| 8,066,219 | B2 * | 11/2011 | Patt et al. | ..................... | 244/12.4 |
| 8,083,172 | B2 * | 12/2011 | Karem | ........................... | 244/7 C |
| 2009/0256026 | A1 * | 10/2009 | Karem et al. | ................ | 244/99.2 |
| 2009/0266941 | A1 * | 10/2009 | Karem | .......................... | 244/7 A |
| 2010/0171001 | A1 * | 7/2010 | Karem | .......................... | 244/7 R |

FOREIGN PATENT DOCUMENTS

KR 100822366 4/2008

* cited by examiner

*Primary Examiner* — Philip J Bonzell
(74) *Attorney, Agent, or Firm* — Cantor Colburn LLP

(57) ABSTRACT

Provided is a high performance tilt rotor aircraft in which a nacelle tilt angle and a flaperon angle mechanically interlock with each other. In the tilt rotor aircraft having nacelles in which rotors are mounted in left and right main wings and configured so that the nacelles rotate according to whether the tilt rotor aircraft conducts forward flight or vertical take-off and landing flight, each of the main wings is provided with a flaperon, and the nacelle and the flaperon are connected to each other by a power transfer unit, such that the flaperon also rotates together with the nacelle at the time of rotation of the nacelle, thereby allowing a change in a nacelle tilt angle to lead to a change in a flaperon angle.

2 Claims, 3 Drawing Sheets

HIGH PERFORMANCE TILT ROTOR AIRCRAFT IN WHICH NACELLE TILT ANGLE AND FLAPERON ANGLE MECHANICALLY INTERWORK WITH EACH OTHER

CROSS-REFERENCE TO RELATED APPLICATIONS

This application claims priority under 35 U.S.C. §119 to Korean Patent Application No. 10-2011-0075646, filed on 29 Jul. 2011, in the Korean Intellectual Property Office, the disclosure of which is incorporated herein by reference in its entirety.

TECHNICAL FIELD

The following disclosure relates to a tilt rotor aircraft capable of flying in a fixed wing flight mode for high speed forward flight and a rotary-wing flight mode for vertical take-off and landing.

BACKGROUND

A tilt rotor aircraft is an aircraft having advantages such as high speed forward flight and long endurance as compared to a general vertical take-off and landing aircraft such as a helicopter, simultaneously with having a vertical take-off and landing function.

A general tilt rotor aircraft includes rotating rotors provided at each of left and right distal ends of a wing and has a structure in which a left rotor and a right rotor rotate in different directions (forward rotate and reversely rotate).

The tilt rotor aircraft may change an angle of a nacelle in which the rotors are mounted according to a flight mode. For example, the tilt rotor aircraft may change the angle of the nacelle so as to be 90 degrees at the time of take-off and landing and to be horizontal to a flight direction, that is, 0 degree, like a fixed wing aircraft at the time of forward flight.

Therefore, the tilt rotor aircraft has both of the advantages such as vertical take-off and landing and high speed forward flight.

In the tilt rotor aircraft, the rotor in the fixed wing flight mode serves to provide thrust for the forward flight and to control yaw movement flight attitude using a difference in thrust between the left rotor and the right rotor.

In addition, a flaperon and an elevator control roll and pitch attitudes (in the case of the tilt rotor aircraft, since a flap is mounted at a tailing edge portion of a main wing and performs both of a flap function for increasing lift in a low speed and an aileron function for controlling a roll attitude, a part performing a flap function and an aileron function will be referred to as the "flaperon").

In the case of the tilt rotor aircraft, in a hovering mode and a low speed rotary-wing flight mode, the rotor provides the lift and most flight attitude control force.

Further, in transition mode flight, control authorities of the rotor, the flaperon, and the elevator are mixed with each other to form a flight attitude ("transition flight" indicates a process of changing a rotary-wing flight mode into a fixed wing flight mode).

In addition, in the rotary-wing flight mode and a low speed transition flight mode, a tilt angle of the nacelle is almost vertical to a chord direction (meaning a direction indicated by a straight line connecting a lead edge portion and a tailing edge portion of the main wing to each other) of the main wing, and propeller wash of the rotor strikes the main wing, such that download acts on the main wing, thereby generating loss of vertical take-off and landing performance.

In order to minimize this download and maximize the lift of the wing at the time of low speed flight, in the hovering mode and the low speed rotary-wing flight mode, a main wing flaperon angle is increased, and as the nacelle angle is changed from the vertical to the horizontal, the flaperon angle is decreased.

Meanwhile, in a flaperon operator, large operation load capability capable of overcoming a moment generated due to aerodynamic load as well a rapid driving speed for controlling a roll movement attitude in accordance with an increase in a forward flight speed are required.

On the other hand, in the case of a nacelle tilt operator, an operator having a low driving speed and large operation load capability is required.

Further, in the hovering mode and the low speed rotary-wing flight mode, the roll movement attitude control is performed using a difference in a collective pitch angle between the left and right rotors. However, in a process of performing the transition flight, as a flight speed increases, roll movement attitude control capability is insufficient only with the difference in a pitch angle between the left and right rotors, such that the control authorities of the rotor and the flaperon are mixed with each other as described above, thereby forming a flight attitude.

In the tilt rotor aircraft, an aspect ratio of the main wing is relatively smaller than that of the general fixed wing aircraft, and a driving axis connecting a main gearbox and a rotor gearbox to each other passes through an inner portion of the main wing, such that a thickness ratio of an airfoil of the main wing is relatively large. Therefore, performances such as an endurance time and a flight distance are slightly lowered.

In order to supplement these disadvantages, a tilt rotor aircraft in which auxiliary wings having various shapes are mounted outside the nacelle has been suggested in Korean Patent No. 10-0822366.

In the related art as described above, a technology of rotating at the same angle as a nacelle angle by fixing the auxiliary wing to the nacelle has been suggested.

In addition, a concept of allowing rotation of the auxiliary wing, extension of a length of the auxiliary wing, spreading of the auxiliary wing, and the like, to be performed by a separate driving unit has been suggested.

However, a specific unit for separately moving the auxiliary wing has not been suggested, and an auxiliary wing driving unit is used only to minimize the download in the transition flight mode.

However, in the case in which the auxiliary wing is fixed to the nacelle, an angle of attack of the auxiliary wing is significantly increased in a low speed section of the transition flight, such that large drag acts on the auxiliary wing. In addition, in the case in which the auxiliary wing is moved using a separate driving unit, several problems such as an increase in weight, an increase in power consumption, an increase in an electric wiring, complexity of a control logic, and the like, due to mounting of the separate driving unit have been generated.

RELATED ART DOCUMENT

Patent Document (Patent Document 1) Korean Patent No. 10-0822366

SUMMARY

An embodiment of the present invention is directed to providing a tilt rotor aircraft in which a flaperon rapidly moves so as to interlock with a change in a nacelle angle in order to correspond to the change in the nacelle angle and performances such as an endurance time and a flight distance are improved without an increase in the number of separate driving operators required for controlling flight.

Another embodiment of the present invention is directed to providing a tilt rotor aircraft including an auxiliary wing driven so that an angle of attack may be changed regardless of a change in a nacelle angle and capable of performing an aileron function of the auxiliary wing in a fixed wing flight mode using the auxiliary angle.

In one general aspect, a tilt rotor aircraft in which a nacelle and a flaperon are mechanically connected to each other by a power transfer unit such as a link device, or the like, such that the flaperon rapidly moves so as to appropriately correspond to a change in a nacelle angle, thereby improving performances such as an endurance time and a flight distance is provided.

The nacelle is provided with an auxiliary wing rotating unit capable of rotating auxiliary wings, such that angles of the auxiliary wings are appropriately adjusted with respect to a nacelle angle in a transition flight mode, thereby minimizing download acting on the auxiliary wings by propeller wash of a rotor and performing an aileron function using a difference between angles of attack of the auxiliary wings in a fixed wing flight mode.

The high performance tilt rotor aircraft has nacelles in which rotors are mounted in left and right main wings and is configured so that the nacelles rotate according to whether the tilt rotor aircraft conducts forward flight or vertical take-off and landing flight.

Each of the main wings is provided with a flaperon, and the nacelle and the flaperon are connected to each other by a power transfer unit, such that the flaperon also rotates together with the nacelle at the time of rotation of the nacelle, thereby allowing a change in a nacelle tilt angle to lead to a change in a flaperon angle.

The nacelle includes an auxiliary wing having a shape in which it is extended in a direction opposite to a body and rotatably installed so that an angle of attack thereof is changed.

The nacelle further includes an auxiliary wing rotating unit rotating the auxiliary wing so that the angle of attack of the auxiliary wing is changed.

The power transfer unit is a link device including a link directly connected to the nacelle, a link directly connected to the flaperon, and a connection link connecting the link directly connected to the nacelle and the link directly connected to the flaperon to each other.

Each of the auxiliary wings positioned at the left nacelle and the auxiliary wing positioned at the right nacelle is separately rotatable.

DETAILED DESCRIPTION OF MAIN ELEMENTS

Figure 1:
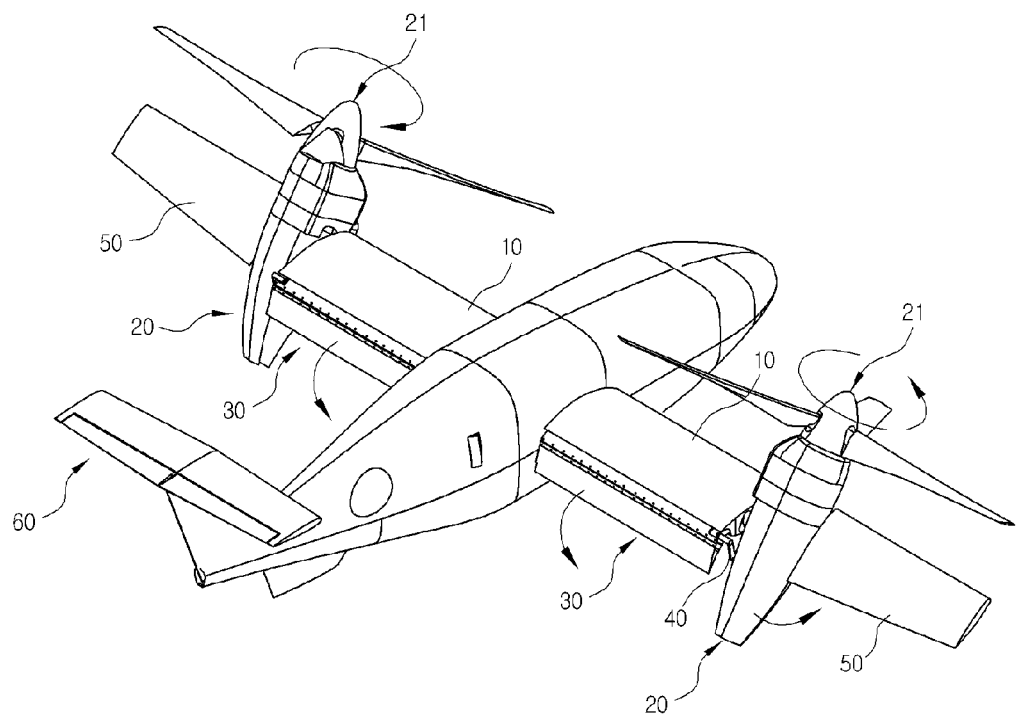
FIG. 1 is a schematic perspective view showing a transition flight state of a tilt rotor aircraft according to an exemplary embodiment of the present invention.
Figure 2:
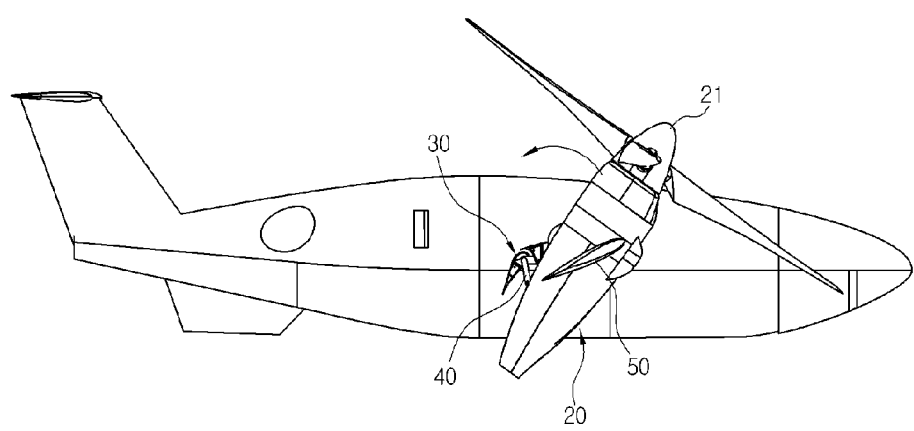
FIG. 2 is a schematic view describing a concept in which an angle of auxiliary wing may be optimally controlled with respect to a nacelle angle at the time of transition flight using an auxiliary wing driving unit according to the exemplary embodiment of the present invention.

| | |
|---|---|
| 10: main wing | 20: nacelle |
| 21: rotor | 22: rotor gear box trunion |
| 30: flaperon | 40: power transfer unit |
| 41, 42, 43: link | 50: auxiliary wing |
| 60: elevator | |

DETAILED DESCRIPTION OF EMBODIMENTS

Hereinafter, a technical idea of the exemplary embodiment of the present invention will be described in more detail with reference to the accompanying drawings.

However, the accompanying drawings are only an example shown for explaining in more detail the technical idea of the present invention and therefore, the technical idea of the present invention is not limited to the accompanying drawings.

The present invention relates to a tilt rotor aircraft.

Therefore, the tilt rotor aircraft also has nacelles 20 in which rotors 21 are mounted in left and right main wings 10.

In addition, the tilt rotor aircraft is configured so that the nacelles 20 rotate according to whether the tilt rotor aircraft conducts forward flight or vertical take-off and landing flight.

The above-mentioned configuration has been well known in the related art.

An object of the present invention is to rapidly move a flaperon 30 so as to appropriately correspond to a change in a nacelle angle.

Another object of the present invention is to provide a tilt rotor aircraft in which performances such as an endurance time and a flight distance are improved.

Due to the above-mentioned reason, according to the exemplary embodiment of the present invention, the nacelle 20 and the flaperon 30 are mechanically connected to each other by a power transfer unit 40 such as a link device, or the like.

More specifically, the main wing 10 according to the exemplary embodiment is provided with the flaperon 30.

The nacelle 20 and the flaperon 30 which are components according to the exemplary embodiment of the present invention are connected to each other by the power transfer unit 40 such as the link device, or the like, such that the flaperon 30 also rotates together with the nacelle 20 at the time of rotation of the nacelle 20, thereby allowing a change in a nacelle tilt angle to lead to a change in a flaperon angle.

According to the above-mentioned configuration, the flaperon 30 rapidly rotates at the time of the rotation of the nacelle 20. Therefore, a separate flaperon operation may not be included.

Since the flaperon operator causes deterioration of the performances such as the endurance time and the flight distance due to several reasons such as significantly heavy weight, when the flaperon operator is not included, the performances such as the endurance time and the flight distance are improved.

As the above-mentioned power transfer unit 40, various types of power transfer units known in the art to allow the nacelle 20 and the flaperon 30 to rotate together with each other may be used.

However, it is preferable that the power transfer unit 40 is a link device as shown in the accompanying drawings in consideration of accuracy of interlocking, a fault generation rate, and the like.

According to the exemplary embodiment of the present invention, it is preferable that when the nacelle 20 rotates from 0 degree horizontal to a flight direction by 90 degrees for vertical take-off and landing flight, that is, when the nacelle 20 rotates so that the nacelle angle becomes 90 degrees with respect to a flying object for vertical take-off and landing or hovering, the flaperon 30 rotates by 70 to 80 degrees.

That is, when the nacelle 20 rotates from 90 degrees vertical to the flight direction so as to become 0 degree horizontal to the flight direction, the flaperon 30 rotates from a state in which it rotates by 70 to 80 degrees toward a direction vertical to the flight direction to 0 degree horizontal to the flight direction.

In addition, when the nacelle 20 rotates from 0 degree horizontal to the flight direction so as to become 90 degrees vertical to the flight direction, the flaperon rotates from 0 degree horizontal to the flight direction by 70 to 80 degrees toward the direction vertical to the flight direction.

The reason is that a flap angle (θ) at the time of the vertical take-off and landing or hovering of the tilt rotor aircraft is 70 to 80 degrees, download acting on the wing by propeller wash of the rotor 21 is the weakest.

In addition, as a flight speed increases, the nacelle angle is transited from 90 degrees to 0 degree. In this process, an influence of the download gradually decreases, such that it may be ignored at a speed of approximately 100 km/h.

Therefore, in the tilt rotor aircraft, generally, as the flight speed increases and the nacelle angle decreases from 90 degrees to 0 degree, the flaperon angle is also adjusted to decrease from 70 degrees to 0 degree according to a preset schedule.

In the case in which the power transfer unit 40 that is the component according to the exemplary embodiment of the present invention is implemented in a link device form, it is easy to implement the flaperon 30 so as to rotate from 70 to 80 degrees to 0 degree (in an opposite case, so as to rotate from 0 degree to 70 to 80 degrees) in a process in which the nacelle 20 rotates from 90 degrees vertical to the flight direction to 0 degree (in an opposite case, in a process in which the nacelle 20 rotates from 0 degree to 90 degrees).

That is, a length of a link 41 directly connected to the nacelle 20 and a length of a link 42 directly connected to the flaperon 30 are appropriately adjusted, thereby making it possible to optimally adjust a change range in the flaperon angle corresponding to the nacelle tilt angle.

The link device shown in the accompanying drawings includes three links having a general bar shape. The link 41 directly connected to the nacelle 20 (in a scheme of being connected to a rotor gear box trunion 22 of the nacelle 20) among the three links is shorter than the link 42 directly connected to the flaperon 30, such that the flaperon angle is smaller than the nacelle tilt angle (the link 41 directly connected to the nacelle and the link 42 directly connected to the flaperon are connected to each other by a connection link 43).

Figure 3:
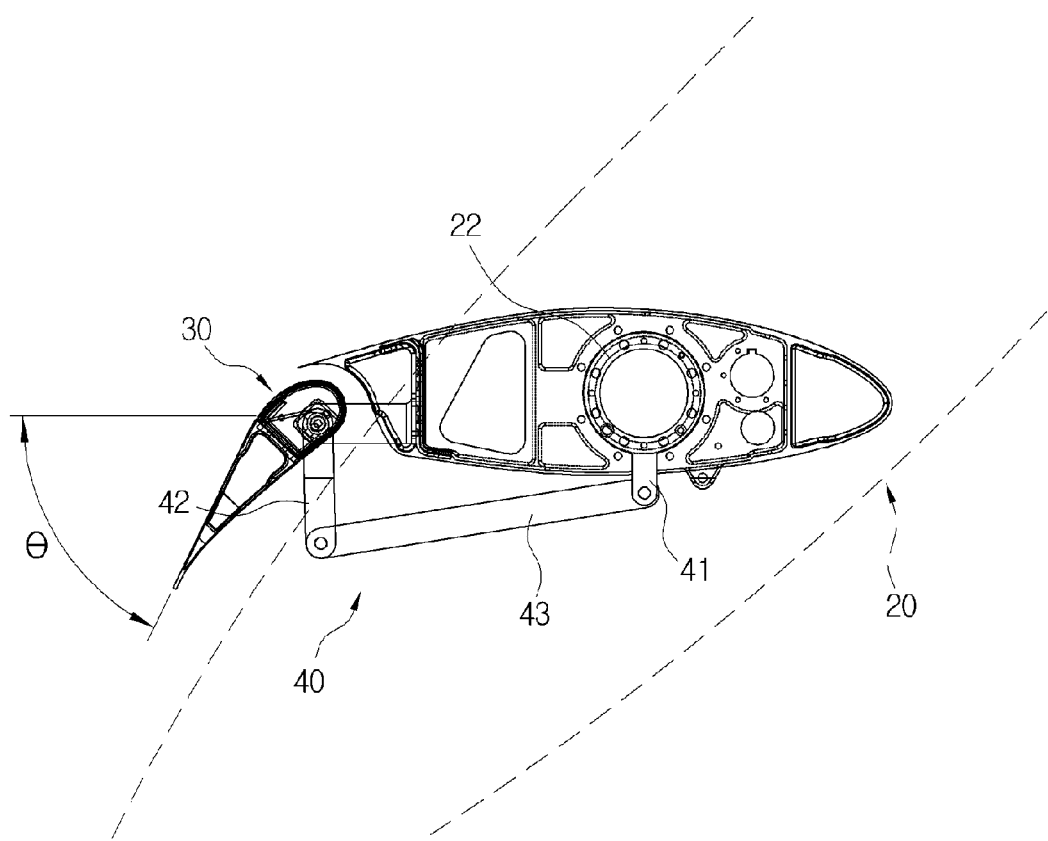
FIG. 3 is a schematic view describing an installation state of a power transfer unit that is a component according to the exemplary embodiment of the present invention.

When the link 41 directly connected to the nacelle 20 rotates leftward from a state as shown in FIG. 3, the flaperon angle is changed while the link 42 directly connected to the flaperon 30 also rotates leftward.

In addition, when the link 41 directly connected to the nacelle 20 rotates rightward from the state as shown in FIG. 3, the flaperon angle is changed while the link 42 directly connected to the flaperon 30 also rotates rightward.

As a result, a change in the nacelle angle leads to a change in the flaperon angle.

According to the exemplary embodiment of the present invention, the nacelle 20 may further include an auxiliary wing 50 having a shape in which it is extended in a direction opposite to a body.

However, in a simple form in which the nacelle includes the auxiliary wing 50 as described above, several problems are caused.

Particularly, in the case in which the auxiliary wing 50 is configured to rotate (be tilted) together with the nacelle 20, an angle of attack of the auxiliary wing 50 becomes large at the time of transition flight, such that large drag acts on the auxiliary wing.

Due to the above-mentioned reason, in the exemplary embodiment of the present invention, the auxiliary wing 50 is rotatably implemented so that the angle of attack thereof may be changed.

To this end, the nacelle 20 further includes an auxiliary wing rotating unit (not shown) rotating the auxiliary wing 50 so that the angle of attack of the auxiliary wing 50 may be changed.

With the above-mentioned configuration, the angle of attack of the auxiliary wing 50 is adjusted, thereby making it possible to perform a flight change under an optimal lift-to-drag ratio condition in a nacelle tilt process.

Further, in a fixed wing flight mode, the entire lift-to-drag ratio of the aircraft is increased only through an increase in a pitch angle of the auxiliary wing 50 rather than increasing lift through an increase in a pitch angle of the aircraft, thereby making it possible to improve the flight performance.

The auxiliary wing rotating unit as described above may be implemented in a form, or the like, such as a flaperon operator installed in the tilt rotor aircraft according to the related art in order to move the flaperon 30.

The flaperon operator according to the related art requires significantly large driving force; however, the auxiliary wing rotating unit may smoothly rotate the auxiliary wing 50 even with driving force significantly smaller than that of the flaperon operator according to the related art.

Therefore, it is possible to make a size of the auxiliary wing rotating unit smaller than that of the flaperon operator according to the related art.

The auxiliary wing rotating unit may also be implemented so as to rotate by driving force of a nacelle operator for rotating the nacelle 20.

The auxiliary wing rotating units each provided in the left and right nacelles 20 may be implemented so that driving thereof may be controlled, respectively.

That is, each of the auxiliary wings positioned at the left nacelle and the auxiliary wing positioned at the right nacelle may separately rotate.

Figure 4:
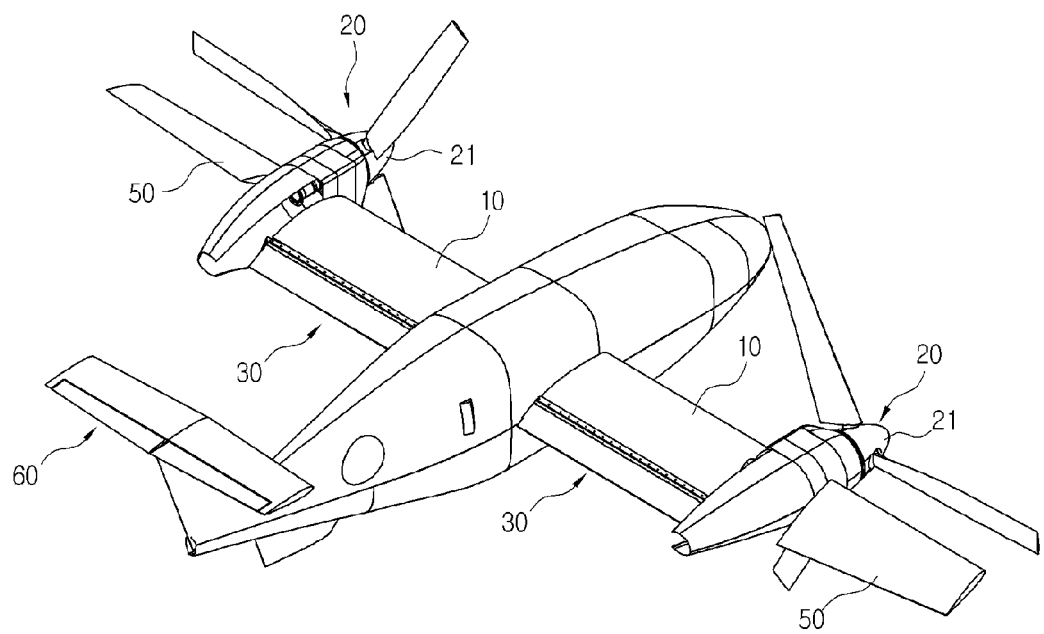
FIG. 4 is a schematic view describing that an aileron function is performed by allowing angles of attack of a left auxiliary wing and a right auxiliary wing to be different when the tilt rotor aircraft according to the exemplary embodiment of the present invention forward flies at a high speed.

With the above-mentioned configuration, as shown in FIG. 4, the left and right auxiliary wings 50 have different angles of attack, thereby making it possible to perform an aileron function and significantly improve roll attitude control force of the auxiliary wings.

FIG. 4 shows a case in which a large difference between angles of attack is generated in order to describe that the left and right auxiliary wings 50 have different angles of attack.

A non-explained reference numeral 43 indicates a link connecting the link 41 directly connected to the nacelle and the link 42 directly connected to the flaperon to each other.

As set forth above, with the tilt rotor aircraft according to the exemplary embodiment of the present invention, the nacelle and the flaperon are mechanically connected to each other by the power transfer unit such as the link device, or the like, such that the flaperon rapidly moves so as to appropriately correspond to the change in the nacelle angle.

In addition, since the flaperon operator having relatively heavy weight is not required in the present invention, the tilt rotor aircraft in which the performances such as the endurance time and the flight distance are relatively improved may be provided.

Since the flaperon operator according to the related art requires high speed movement and large driving force, in the case in which the flaperon operator is omitted, a manufacturing cost may be reduced.

According to the exemplary embodiment of the present invention, in the case in which the auxiliary wing having a shape in which it is extended in a direction opposite to the body and rotatably installed so that the angle of attack thereof is changed is included in the nacelle and the auxiliary wing rotating unit is further included in the nacelle, the download acting on the auxiliary wing by the propeller wash of the rotor is minimized through relative adjustment of the auxiliary wing with respect to the nacelle angle, thereby making it possible to prevent deterioration of the performance in the rotary-wing flight mode and further improve the performances such as the endurance time and the flight distance in the fixed wing flight mode.

Further, since the auxiliary wings are positioned outside the nacelles, the roll attitude may be controlled because a difference between lifts generated in the left and right auxiliary wings is significantly smaller than a difference between lifts generated in the left and right flaperons, and since the auxiliary wing driving unit (operator) has driving load smaller than that of the flaperon operator and an operator driving stroke shorter than that of the flaperon operator, the auxiliary wing driving unit has a significant advantage in view of size and weight.

What is claimed is:

1. A high performance tilt rotor aircraft in which a nacelle tilt angle and a flaperon angle mechanically interlock with each other, the high performance tilt rotor aircraft having nacelles in which rotors are mounted on an outboard edge of left and right main wings and configured so that the nacelles rotate with respect to the main wings according to whether the tilt rotor aircraft conducts forward flight or vertical take-off and landing flight, wherein each of the main wings is provided with a flaperon, and the nacelle and the flaperon are connected to each other by a power transfer unit, such that the flaperon also rotates together with the nacelle at the time of rotation of the nacelle, thereby allowing a change in a nacelle tilt angle to lead to a change in a flaperon angle, wherein the nacelle includes: an auxiliary wing having a shape in which it is extended in a direction opposite to a body and rotatably installed so that an angle of attack thereof is changed, wherein the power transfer unit is a link device including a link directly connected to the nacelle, a link directly connected to the flaperon, and a connection link connecting the link directly connected to the nacelle and the link directly connected to the flaperon to each other, and wherein each of the auxiliary wing positioned at the left nacelle and the auxiliary wing positioned at the right nacelle is separately rotatable.

2. The high performance tilt rotor aircraft of claim 1, wherein when the nacelle rotates from 90 degrees vertical to a flight direction so as to become 0 degree horizontal to the flight direction, the flaperon rotates from a state in which it rotates by 70 to 80 degrees toward a direction vertical to the flight direction to 0 degree horizontal to the flight direction, and when the nacelle rotates from 0 degree horizontal to the flight direction so as to become 90 degrees vertical to the flight direction, the flaperon rotates from 0 degree horizontal to the flight direction by 70 to 80 degrees toward the direction vertical to the flight direction.

* * * * *